United States Patent [19]

Goebel et al.

[11] 4,283,468

[45] Aug. 11, 1981

[54] ELECTROCHEMICAL CELL INSENSITIVE TO PHYSICAL ORIENTATION

[75] Inventors: Franz Goebel, Sudbury; Cyril Morgan, Manchester, both of Mass.

[73] Assignee: GTE Products Corporation, Stamford, Conn.

[21] Appl. No.: 145,177

[22] Filed: Apr. 29, 1980

[51] Int. Cl.³ .............................................. H01M 2/38
[52] U.S. Cl. ........................................ 429/81; 429/72; 429/196
[58] Field of Search ........................ 429/72, 81, 67, 70, 429/110, 112–118, 196

[56] References Cited

U.S. PATENT DOCUMENTS

| | | | |
|---|---|---|---|
| 3,166,447 | 1/1965 | Bronstert et al. | 429/70 |
| 3,362,852 | 1/1968 | Corren et al. | 429/72 X |
| 4,004,946 | 1/1977 | Farrington et al. | 429/72 |
| 4,038,459 | 7/1977 | Ajami et al. | 429/70 X |
| 4,060,668 | 11/1977 | Isoebel | 429/164 X |
| 4,115,630 | 9/1978 | Ommering et al. | 429/72 |
| 4,148,974 | 4/1979 | Eppley | 429/113 X |
| 4,237,197 | 12/1980 | Hart | 429/81 |

Primary Examiner—Charles F. LeFevour
Attorney, Agent, or Firm—Peter Xiarhos

[57] ABSTRACT

A primary electrochemical cell insensitive to physical orientation or position over the rated life span of the cell. The cell includes an elongated metal housing and a battery stack disposed intermediate to the ends of the housing to define first and second electrolyte reservoirs at the ends of the housing. The battery stack includes an electrolyte-conducting opening or channel therethrough in direct communication with the first and second reservoirs and is fixed in position in the housing by means of pedestals within the reservoirs and in abutment with the battery stack. The pedestals have a number of openings therein by which electrolyte solution in the reservoirs can pass unrestrictedly to the battery stack and to the opening through the battery stack. The electrolyte solution is of a type which is consumed by reaction within the cell over the rated life span of the cell leading to a volume loss of the electrolyte solution. The reservoirs and the opening through the stack, together with electrolyte conducting channels in porous components of the stack, cooperate in the event of a change in the physical orientation of the cell over its rated life span to shift the electrolyte solution within the cell so as to continue to supply electrolyte solution to the battery stack and thereby prevent an electrolyte "starvation" condition in the cell.

17 Claims, 4 Drawing Figures

ELECTROCHEMICAL CELL INSENSITIVE TO PHYSICAL ORIENTATION

CROSS-REFERENCE TO RELATED APPLICATIONS

In co-pending patent application Ser. No. 145,181, filed concurrently herewith in the names of Franz Goebel and Cyril Morgan, and entitled "Electrochemical Cell", there is disclosed and claimed a battery stack including a cathode current collector electrode structure which may be employed within an electrochemical cell as disclosed and claimed in the present application.

In co-pending patent application Ser. No. 145,108, filed concurrently herewith in the names of Franz Goebel and Ibsen R. Hansen, and entitled "Method for Assembling an Electrochemical Cell", there is disclosed and claimed a method for assembling a battery stack including a cathode current collector electrode structure which may be employed within an electrochemical cell as disclosed and claimed in the present application.

BACKGROUND OF THE INVENTION

The present invention relates to an electrochemical cell and, more particularly, to a primary electrochemical cell insensitive to physical position or orientation.

The majority of electrochemical cells, especially large cells employing a liquid electrolyte solution, ordinarily operate in a particular physical position or orientation, for example, in a vertical upright position. These cells generally include an electrochemical system comprising one or more cathode electrodes, separators, and an electrolyte solution in contact with these elements. The cell elements, commonly referred to as the battery stack, are generally positioned at the bottom of the cell and completely covered with the electrolyte solution. A reservoir is normally provided above the battery stack for containing a sufficient amount of the electrolyte solution to insure that the battery stack is completely covered by the electrolyte solution. This reservoir is especially important in a cell employing a liquid electrolyte solution which is chemically consumed, that is, undergoes a volume loss, during normal operation of the cell. In this case, the reservoir contains a sufficient amount of electrolyte solution to insure that the battery stack is continuously supplied with electrolyte solution over the normal expected life span, or discharge cycle, of the cell. An example of an electrochemical cell of the above type is described in detail in U.S. Pat. No. 4,161,063, in the names of Franz Goebel and Nikola Marincic, and assigned to GTE Laboratories Incorporated. Electrochemical cells constructed in accordance with the above patent generally include a plurality of oxidizable active anodes, a plurality of cathode current collector electrode structures arranged in alternation with the anodes, and a cathodelectrolyte solution in contact with the anodes and cathode current collector structures and comprising a reducible soluble cathode and an electrolyte solute dissolved therein. In a preferred construction of a cell, the oxidizable active anodes are formed of an oxidizable active alkaline metal such as lithium, the cathode current collector electrode structures include carbon black material, and the cathodelectrolyte solution comprises thionyl chloride (reducible soluble cathode) and lithium tetrachloroaluminate (electrolyte solute) dissolved in the thionyl chloride.

As mentioned hereinabove, large electrochemical cells of the abovedescribed type have a specified physical operating position or orientation over the discharge cycle, specifically, an upright vertical position. However, in small calls employing a consumable cathodelectrolyte solution, for example, of a type disclosed in U.S. Pat. No. 4,060,668 in the name of Franz Goebel, an upright vertical position during discharge cannot be guaranteed and it is therefore possible and likely for such a cell to be used for long periods of time in an upside down position and/or on the side. Under these circumstances, and especially as the cathodelectrolyte solution is consumed, it is possible for the battery stack to be denied sufficient electrolyte solution over the discharge cycle of the cell. As a result of this electrolyte "starvation", the cell is very likely to undergo capacity losses, a lower voltage profile, and a possible undesirable increase in operating temperature of the cell, leading to possible physical damage to the cell.

BRIEF SUMMARY OF THE INVENTION

In accordance with the present invention an electrochemical cell is provided which is insensitive to physical orientation over the rated life span of the cell.

The electrochemical cell in accordance with the invention includes an elongated housing having first and second ends and containing an electrochemical system therewithin. The electrochemical system generally comprises a battery stack, channel means and a liquid electrolyte solution. The battery stack is fixedly disposed intermediate to the first and second ends of the housing and defines first and second reservoirs with the first and second ends, respectively. The channel means is arranged to communicate with the first and second reservoirs for permitting the passage therebetween of electrolyte solution. In a preferred form of the invention, the channel means takes the form of a hollow tube extending through the battery stack. The liquid electrolyte solution is supplied to, and in contact with, the battery stack and present within the first and second reservoirs and the channel means. This electrolyte solution is initially present in the cell in an amount related to the rated life span of the cell and includes a component consumable over the rated life span of the cell by reaction within the cell whereby the electrolyte solution undergoes a loss in volume. The first and second reservoirs and the channel means as mentioned hereinabove cooperate in the event of a change in the physical orientation of the cell over its rated life span to shift the electrolyte solution within the cell so as to continue to supply electrolyte solution to the battery stack.

BRIEF DESCRIPTION OF THE DRAWING

Various objects, features and advantages of an orientation-insensitive primary electrochemical cell in accordance with the present invention will be apparent from a detailed discussion taken in conjunction with the accompanying drawing in which.

DETAILED DESCRIPTION OF THE INVENTION

Figure 1:
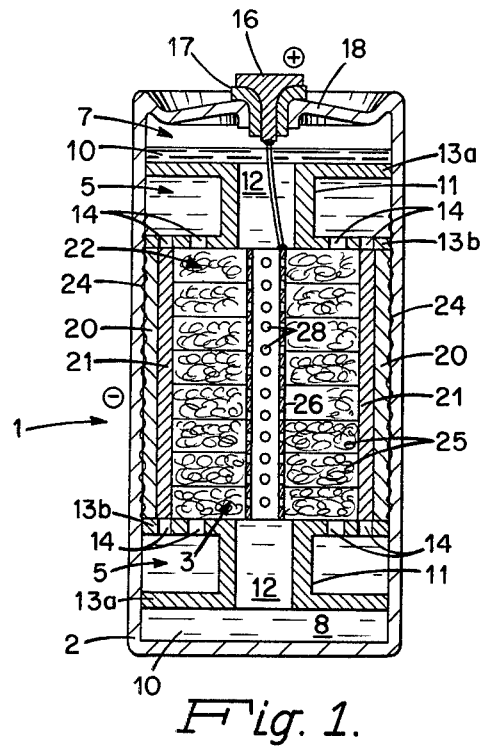
FIG. 1 is an elevational view, partly in cross section, of an orientation-insensitive primary electrochemical cell in accordance with the present invention.

Referring now to FIG. 1, there is shown an orientation-insensitive primary electrochemical cell 1 in accordance with the present invention. As shown in FIG. 1, the electrochemical cell 1 generally includes an elongated casing or housing 2, for example, of a cylindrical configuration and closed at one end. A battery stack 3 is disposed within the housing 2 and fixed in position intermediate to the opposed ends of the housing 2 by means of a pair of pedestals 5. The dimensions of the housing 2 and the compenents placed therein are selected so as to establish a first, or top, reservoir 7 above the battery stack 3 and a second, or lower, reservoir 8 beneath the battery stack 3. An electrolyte solution 10, for example, in the form of a cathodelectrolyte solution, is provided within the interior of the cell 1 to permeate various portions of the battery stack 3, in a manner to be described in detail hereinafter, and also to fill the reservoirs 7 and 8. The electrolyte solution present within the reservoirs 7 and 8 is consumed by chemical reaction in the cell during the rated life span, or discharge cycle, of the cell 1 and is initially present in the cell in an amount related to the expected rated life span of the cell. A suitable and preferred form of the electrolyte solution 10 which is usable with the components of the battery stack 3 (a preferred form of which will be described in greater detail hereinafter), is a cathodelectrolyte solution including a reducible soluble cathode, such as thionyl chloride, and an electrolyte solute, such as lithium tetrachloroaluminate, dissolved in the thionyl chloride.

Figure 2:
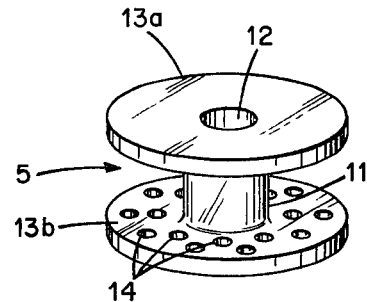
FIGS. 2–4 are perspective views of components employed in the electrochemical cell of FIG. 1.

The aforementioned pedestals 5 have a configuration as shown in FIG. 2. The pedestals 5 are disposed within the aforementioned reservoirs 7 and 8 in abutment with the battery stack 3 and serve to insure that the battery stack 3 is fixed in position intermediate to the opposed ends of the cell 1 while permitting unrestricted electrolyte flow into the battery stack 3 and between the two reservoirs 7 and 8. As shown in FIG. 2, each of the pedestals 5 has a cylindrical central portion 11 with an opening 12 therethrough, a flat top portion 13a, and a flat bottom portion 13b adjacent to the battery stack 3 and having numerous small openings 14 therethrough. Although not shown in the drawing, small openings may also be provided in the flat top portion 13a of each pedestal 5. The openings 12 and 14 in the pedestals 5 allow electrolyte solution within the reservoirs 7 and 8 to pass or migrate unrestrictedly into the battery stack 3 and also from one reservoir to the other, for example, as a result of a change in physical position or orientation of the cell 1 as will be explained in greater detail hereinafter. In the case of the pedestal 5 in the upper reservoir 7, the opening 12 in this pedestal further serves to provide a direct path for the connection of a metal strip 15 from the battery stack 3 to a positive terminal 16 of the cell 1. The metal strip 15, for example, of nickel, is connected to the terminal 16 by means of a standard insulative glass or ceramic-to-metal seal 17 provided within an hermetically sealed cap 18 of the cell 1.

The pedestals 5 as described hereinabove are selected of an electrically insulative material which will not react significantly with the electrolyte solution 10. For the abovementioned specific cathodelectrolyte solution, suitable materials for the pedestals 5 are glass, fiberglass, and "Teflon" (tetrofluorethylene fluorocarbon polymers and fluorinated ethylene-propylene resins). The dimensions of the pedestals 5 are established relative to the interior dimensions of the housing 2 so that they can be tightly press fit within the cell 1 during assembly of the cell 1 and prevent lateral movement of components of the battery stack 3.

The aforementioned battery stack 3 and the electrolyte solution 10 as discussed hereinabove collectively represent the electrochemical system of the cell 1. The battery stack 3 as shown in FIG. 1 generally includes a concentric arrangement of an anode 20, a thin, porous separator 21, and a cathode current collector electrode structure 22. The anode 20, which takes the form of a cylindrical sheet and which may be of an oxidizable active alkaline metal such as lithium, is connected mechanically and electrically to the housing 2 by means of a fine metal screen or grid 24 which is spot welded to the interior wall of the housing 2 and into which the lithium anode is physically pressed to secure the lithium anode to the screen 24. The electrical connection of the anode 20 to the housing 2 establishes the housing 2, which may be of stainless steel, as the negative terminal for the cell 1.

The aforementioned porous separator 21 is employed to electrically isolate the anode 20 from the cathode current collector electrode structure 22 and typically takes the form of a cylindrical sheet of a standard electrically-nonconductive material such as fiberglass.

Figure 3:
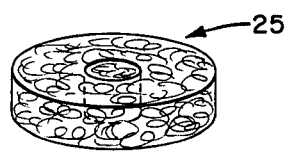

The aforementioned cathode current collector electrode structure 22 generally comprises a plurality of annular, or disc-shaped, porous carbon elements 25 arranged directly above each other in a vertical stacked array, and an elongated, perforated, expandable metal tube 26 disposed within central openings of the elements 25. The plurality of porous carbon elements 25, when used with the aforementioned components and specific materials of the cell 1, act as a cathode current collector and as a catalyst where the reduction of the solvent (thionyl chloride) in the cathodelectrolyte solution takes place. Each of the elements 25, a preferred form of which is shown in FIG. 3, is produced by compressing together a plurality of discrete, semi-rigid, porous carbon conglomerates thereby to define a network of electrolyte-conducting channels throughout the element 25. The conglomerates generally contain a combination of carbon black, graphite, and a binder such as "Teflon". By virtue of the small physical size of each of the elements 25, for example, one inch in diameter and one-half inch thickness for a "D"-sized cell, a stacked vertical array of carbon elements of any desirable length may be assembled by simply selecting the required number of elements 25 for the particular size of cell and stacking the elements one atop the other as indicated in FIG. 1. For a "D"-sized cell, for example, eight elements 25 would be sufficient. Techniques for producing the conglomerates employed by the carbon elements 25 are described in detail in the aforementioned U.S. Pat. No. 4,161,063 to which reference may be made for specific details.

Figure 4:
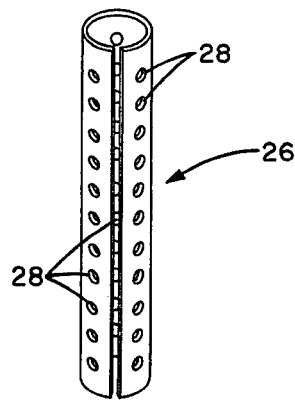

The perforated expandable metal tube 26 employed with the multiple carbon elements 25 as discussed hereinabove takes the specific form as shown in FIG. 4. As shown in FIG. 4, the perforated metal tube 26, which may be of nickel or stainless steel, is split along its entire length to define a generally C-shaped cross section and includes a large number of small openings 28. The openings 28 may be produced by simple metal stamping operations. In assembling the perforated metal tube 26 into the cell 1, the carbon elements 25 are first loosely placed around the tube 26 in its non-expanded state following which the porous separator 21 and the anode 20 (in the grid 24) are wrapped in succession around the tube/carbon element assembly. The complete assembly so formed is then placed into the housing 2 and the tube 26 is permanently expanded outwardly. This expansion is accomplished by means of a suitable tool (not shown) which is inserted into the hollow center of the tube 26 and advanced along the full length of the tube 26 and then withdrawn. As the tube 26 expands outwardly, it establishes a close physical fit with adjacent interior wall portions of the carbon elements 25 thereby securing the array of carbon elements 25 to the tube 26. The openings 28 in the tube 26, together with the widened slit in the tube 26 and the openings 12 and 14 in the pedestals 5, serve to allow electrolyte solution 10 (e.g., cathodelectrolyte solution) within the reservoirs 7 and 8 and the tube 26 to permeate and saturate the carbon elements 25 (by way of the aforedescribed electrolyte-conducting channels formed within the elements 25) and also to permeate the porous separator 21. In addition, the electrolyte solution causes the carbon elements 25 to expand outwardly, or swell (by up to twenty percent), thereby filling the openings 28 in the tube 26 with constituent particles of the carbon elements 25 and establishing a permanent physical union between the tube 26 and the elements 25. The swelling of the carbon elements 25 also results in a solid, compact battery stack 3 within the cell 1. Further, by virtue of the electrolyte channels in the elements 25, the electrolyte solution is able to penetrate the carbon elements 25 and contact interior cathodic particles, thereby providing substantial active surface areas for increasing the rate capability and cell discharge capacity of the cell 1. During the discharge of the cell 1, the tube 26 electrically contacts the interior portions of the carbon elements 25 to function as a current collector.

The abovedescribed features of the battery stack 3 are also disclosed, and claimed, in the aforementioned co-pending patent application Ser. No. 145,181. Details relative to the method of assembly of the battery stack 3, including the assembly of the cathode current collector electrode structure 22, are disclosed and claimed in the aforementioned co-pending application, Ser. No. 145,108.

The tube 26 as described hereinabove also serves in accordance with the present invention to provide a bidirectional path for the rapid flow of electrolyte solution between the two reservoirs 7 and 8. Thus, for example, if the cell 1 as shown in FIG. 1 is turned upside down or placed on its side during the normal rated life span, or discharge cycle, of the cell, the electrolyte solution (e.g., cathodelectrolyte solution) in the cell 1 will shift quickly by way of the opening through the tube 26 and the two reservoirs 7 and 8, thereby insuring that the battery stack 3 will continue to be exposed to, and supplied with, electrolyte solution. Electrolyte solution will also pass between the reservoirs 7 and 8 by virtue of the electrolyte conducting channels in the carbon elements 25, albeit at a slower rate. Any gas bubbles which might form in the cell as the electrolyte solution is consumed (and discharge products are formed) during the discharge cycle are similarly able to pass from one reservoir to the other reservoir rather than being continuously or permanently trapped in one reservoir. The presence of the two reservoirs 7 and 8 communicating with the opening through the tube 26 thereby substantially minimizes the opportunity of an electrolyte starvation condition occurring within the cell 1 during the normal rated life span of the cell. The performance of the cell 1 accordingly remains more or less constant irrespective of the particular physical position or orientation of the cell 1 during its discharge cycle.

While there has been described what is considered to be a preferred embodiment of the invention, it will be apparent to those skilled in the art that various changes and modifications may be made therein without departing from the invention as called for in the appended claims.

What is claimed is:

1. A primary electrochemical cell insensitive to physical orientation over the rated life span of the cell, comprising:
   an elongated housing having first and second ends and containing an electrochemical system therewithin, said electrochemical system comprising:
   a battery stack fixedly disposed intermediate to the first and second ends of the housing and defining first and second reservoirs with said first and second ends, respectively;
   channel means in communication with the first and second reservoirs for permitting bi-directional passage therebetween of electrolyte solution; and
   a liquid electrolyte solution supplied to and in contact with the battery stack and present within the first and second reservoirs and the channel means, said electrolyte solution being chemically reactive with the battery stack and being initially present in the cell in an amount related to the rated life span of the cell, said electrolyte solution including a component consumable during discharge of the cell by chemical reaction within the cell resulting in the electrolyte solution undergoing a loss in volume, said first and second reservoirs and the channel means cooperating in the event of a change in the physical orientation of the cell over its rated life span to shift the electrolyte solution within the cell so as to continue to supply electrolyte solution to the battery stack.

2. A primary electrochemical cell insensitive to physical orientation over the rated life span of the cell, comprising:
   an elongated housing having first and second ends and containing an electrochemical system therewithin, said electrochemical system comprising:
   a battery stack fixedly disposed intermediate to the first and second ends of the housing and defining first and second reservoirs with said first and second ends, respectively, said battery stack having a plurality of electrolyte-conducting channels therethrough in communication with the first and second reservoirs for the bi-directional passage of electrolyte solution between the first and second reservoirs; and
   a liquid electrolyte solution supplied to and in contact with the battery stack and present within the first and second reservoirs and the channels through the battery stack, said electrolyte solution being chemically reactive with the battery stack and being initially present in the cell in an amount related to the rated life span of the cell, said electrolyte solution including a component consumable during discharge of the cell by chemical reaction within the cell resulting in the electrolyte solution undergoing a loss in volume, said first and second reservoirs and the electrolyte-conducting channels through the battery stack cooperating in the event of a change in the physical orientation of the cell over its rated life span to shift the electrolyte solution within the cell so as to continue to supply electrolyte solution to the battery stack.

3. A primary electrochemical cell in accordance with claim 2 wherein:

one of the electrolyte-conducting channels through through the battery stack is a continuous opening extending completely through the battery stack and in direct communication with the first and second reservoirs.

4. A primary electrochemical cell insensitive to physical orientation over the rated life span of the cell, comprising:

an elongated housing having first and second ends and containing an electrochemical system therewithin, said electrochemical system comprising:
 a battery stack fixedly disposed intermediate to the first and second ends of the housing and defining first and second reservoir, respectively, said battery stack having an opening therethrough in direct communication with the first and second reservoirs for the bi-directional passage of electrolyte solution between the first and second reservoirs; and
 a liquid electrolyte solution supplied to and in contact with the battery stack and present within the first and second reservoirs and the opening through the battery stack, said electrolyte solution being chemically reactive with the battery stack and being initially present in the cell in an amount related to the rated life span of the cell, said electrolyte solution including a component consumable during discharge of the cell by chemical reaction within the cell resulting in the electrolyte solution undergoing a loss in volume, said first and second reservoirs and the opening through the battery stack cooperating in the event of a change in the physical orientation of the cell over its rated life span to shift the electrolyte solution within the cell so as to continue to supply electrolyte solution to the battery stack.

5. A primary electrochemical cell in accordance with claim 4 comprising:

first and second means disposed within the first and second reservoirs, respectively, and arranged to fix the battery stack in position intermediate to the first and second ends of the housing and to simultaneously permit unrestricted bi-directional flow of electrolyte solution to the battery stack and to the opening through the battery stack.

6. A primary electrochemical cell in accordance with claim 5 wherein:

each of the first and second means has a plurality of openings therein in direct communication with the battery stack and the opening through the battery stack by which electrolyte solution in the associated reservoir can be supplied to the battery stack and to the opening through the battery stack.

7. A primary electrochemical cell in accordance with claim 5 wherein:

each of the first and second means is in the form of a pedestal of an insulative material and including a first portion adjacent to the associated end of the cell, a second portion in abutment with the battery stack and having a plurality of openings therein in direct communication with the battery stack, and a central portion intermediate to the first and second portions and having a central opening therein in direct communication with the opening through the battery stack, whereby electrolyte solution in the associated reservoir may be supplied by way of the openings in the pedestal to the battery stack and to the opening through the battery stack.

8. A primary electrochemical cell in accordance with claim 7 wherein:

the dimensions of the pedestals are selected relative to the interior dimensions of the cell so as to enable the pedestals to be press fit within the cell in abutment with the battery stack.

9. A primary electrochemical cell in accordance with claim 7 further comprising:

an electrical terminal electrically isolated from the housing and adjacent to one of the pedestals; and
a metallic strip connected between the battery stack and the electrical terminal by way of the central opening in the said one of the pedestals.

10. A primary electrochemical cell in accordance with claim 9 wherein:

the housing of the cell is generally cylindrical in configuration; and
the battery stack is generally cylindrical in configuration and includes a plurality of components arranged concentrically with respect to each other.

11. A primary electrochemical cell in accordance with claim 6 wherein:

the battery stack includes components adjacent to the opening through the battery stack and arranged to be supplied with, and permeated by, electrolyte solution within the cell by way of the opening through the battery stack and the openings in the first and second means.

12. A primary electrochemical cell in accordance with claim 4 wherein the battery stack comprises:

an electrode in contact with the elongated housing;
a porous separator in contact with the electrode; and
a carbon cathode current collector structure in contact with the separator and including:
 a porous elongated carbon structure having a central opening extending therethrough; and
 an elongated hollow metal cathode current collector tube disposed within the opening through the carbon structure and defining an opening through the battery stack, said cathode current collector tube including a plurality of openings along its length by which electrolyte solution within the tube can be supplied to, and permeate, the carbon structure and the porous separator.

13. A primary electrochemical cell in accordance with claim 12 wherein:

the electrode is an anode including an oxidizable alkaline metal; and
the electrolyte solution includes a reducible soluble cathode and an electrolyte solute dissolved in the soluble cathode.

14. A primary electrochemical cell in accordance with claim 13 wherein:

the oxidizable alkaline metal of the anode electrode is lithium;
the reducible soluble cathode of the electrolyte solution is thionyl chloride; and
the electrolyte solute of the electrolyte solution is lithium tetrachloroaluminate.

15. A primary electrochemical cell in accordance with claim 14 comprising:
first and second means disposed within the first and second reservoirs, respectively, and arranged to fix the battery stack in position intermediate to the first and second ends of the housing and to simultaneously permit unrestricted bi-directional flow of electrolyte solution to the battery stack and to the opening through the battery stack.

16. A primary electrochemical cell in accordance with claim 15 wherein:
each of the first and second means has a plurality of openings therein in direct communication with the battery stack and the opening through the battery stack by which electrolyte solution in the associated reservoir can be supplied to the battery stack and to the opening through the battery stack.

17. A primary electrochemical cell in accordance with claim 16 wherein:
the anode, separator and carbon cathode current collector structure are generally cylindrical in configuration and arranged concentrically with respect to each other along the length of the housing.

* * * * *